Patented Nov. 2, 1937

2,097,586

UNITED STATES PATENT OFFICE 2,097,586

PRODUCTION OF POLYMERIZED UNSATURATED COMPOUNDS

John William Croom Crawford, Ardrossan, Scotland, assignor to Imperial Chemical Industries, Limited, a corporation of Great Britain No Drawing. Application February 25, 1935, Serial No. 8,218. In Great Britain March 2, 1934

10 Claims. (Cl. 260—2)

This invention relates to the preparation of compounds containing the vinyl groups $CH_2:CH-$ and compounds containing an alpha-substituted vinyl group having improved ultra-violet light transmitting properties rendering them particularly suitable for use in the manufacture of such objects as window panes, garden frames and the like in which the ultra-violet transmission is of importance.

Organic compounds containing the group $CH_2=CH-$ or compounds containing such a group substituted in the alpha position, have as a rule the property of condensing to form polymerized resinous substances when warmed with acyl peroxides. Thus when a 0.5% solution of benzoyl peroxide in the methyl ester of α-methylacrylic acid is warmed there is formed a transparent polymer of methyl methacrylate, and a similar reaction occurs when esters of vinyl alcohol or substituted vinyl are heated with acyl peroxides. When more than one unsaturated compound are polymerized, the product is usually described as an interpolymer.

According to my invention a peroxide of an aliphatic dibasic acid is used as catalyst in the polymerization of a compound containing the unsaturated group $CH_2:CH$ or substituted derivatives thereof. The polymerized material so obtained has a considerably enhanced transparency to ultra-violet light, which greatly increases its value for many purposes.

As suitable peroxides there may be mentioned by way of example the peroxides of succinic, methyl succinic and glutaric acids. These may be prepared by treating the appropriate anhydride with hydrogen peroxide. I have obtained particularly good results with the methyl ester of α-methylacrylic acid.

In carrying my invention into effect sufficient of the peroxide may be dissolved in the monomeric compound to give the required molecular aggregation in the polymer, the proportion usually lying between .005 to 2% by weight reckoned on the weight of the monomer. The solution may be warmed to initiate polymerization and kept at a raised temperature until polymerization is complete. I have usually found that this can be accomplished at temperatures between 60 and 100° C. in periods varying from 1-72 hours.

Example 0.5 gram of succinyl peroxide is dissolved in 100 grams of the methyl ester of α-methylacrylic acid of B. P. 99–100° C. The solution is warmed to 80° C. for 3 hours, by the end of which time the ester will be found to have polymerized into a colourless block having good ultra-violet light transmitting properties.

I claim:
1. Process for the manufacture of products of enhanced transparency to ultra-violet light by the polymerization of a compound selected from the group consisting of mono-olefin compounds containing the vinyl groups $CH_2:CH-$ and mono-olefin compounds containing the alpha-substituted vinyl group which consists in using as polymerization catalysts peroxides of aliphatic dibasic acids.
2. Process as claimed in claim 1 in which the polymerization catalyst is succinyl peroxide.
3. Process for the manufacture of products of enhanced transparency to ultra-violet light by the polymerization of the methyl ester of α-methylacrylic acid which consists in using as polymerization catalysts peroxides of aliphatic dibasic acids.
4. Process as claimed in claim 3 in which the polymerization catalyst is succinyl peroxide.
5. Process for the manufacture of polymerization products of enhanced transparency to ultra-violet light which consists in dissolving in a monomeric compound selected from the group consisting of mono-olefin compounds containing the vinyl groups $CH_2:CH-$ and mono-olefin compounds containing the alpha-substituted vinyl group 2% or less of an aliphatic dibasic acid peroxide and warming the solution until polymerization is complete.
6. Process as claimed in claim 5 where the monomeric compound is the methyl ester of α-methylacrylic acid.
7. Process as claimed in claim 5 where the polymerization catalyst is succinyl peroxide.
8. A process for the manufacture of a methyl ester of alpha methacrylic acid of enhanced transparency to ultra-violet light which comprises polymerizing the monomeric methyl ester of alpha methacrylic acid in the presence of from 0.005 to 2.0% by weight of a peroxide of an aliphatic dibasic acid.
9. A process for the manufacture of a methyl ester of alpha methacrylic acid of enhanced transparency to ultra-violet light which comprises dissolving 0.5 part of succinyl peroxide in 100 parts of the monomeric methyl ester of alpha methacrylic acid, and maintaining the resulting solution at 80° C. for approximately three hours to polymerize the ester.
10. The process of claim 1 in which 0.005 to 2.0% by weight of the peroxide is employed.

JOHN WILLIAM CROOM CRAWFORD.